(12) United States Patent
Weaver

(10) Patent No.: US 8,037,499 B2
(45) Date of Patent: Oct. 11, 2011

(54) SYSTEMS, METHODS, AND COMPUTER PRODUCTS FOR RECORDING OF REPEATED PROGRAMS

(75) Inventor: Timothy H. Weaver, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 867 days.

(21) Appl. No.: 11/964,808

(22) Filed: Dec. 27, 2007

(65) Prior Publication Data

US 2009/0172742 A1  Jul. 2, 2009

(51) Int. Cl.
*H04N 5/445* (2006.01)

(52) U.S. Cl. ............... 725/58; 725/34; 725/60; 725/86; 725/142; 725/146

(58) Field of Classification Search .................. 725/58, 725/86, 60, 34, 142, 146, 134
See application file for complete search history.

(56) References Cited

U.S. PATENT DOCUMENTS

| | | | |
|---|---|---|---|
| 5,790,935 A | 8/1998 | Payton | |
| 6,072,982 A | 6/2000 | Haddad | |
| 6,411,307 B1 | 6/2002 | Rosin et al. | |
| 7,006,881 B1 | 2/2006 | Hoffberg et al. | |
| 7,150,017 B1 | 12/2006 | Vogl et al. | |
| 2003/0005452 A1* | 1/2003 | Rodriguez | 725/86 |
| 2003/0188316 A1 | 10/2003 | DePrez | |
| 2004/0210936 A1* | 10/2004 | Rao et al. | 725/87 |
| 2005/0050577 A1 | 3/2005 | Westbrook et al. | |
| 2005/0098619 A1 | 5/2005 | Ito | |
| 2006/0117364 A1 | 6/2006 | Vitenberg | |
| 2006/0212908 A1 | 9/2006 | Hunter et al. | |

* cited by examiner

*Primary Examiner* — Joseph P Hirl
*Assistant Examiner* — Jivka Rabovianski
(74) *Attorney, Agent, or Firm* — Cantor Colburn LLP

(57) ABSTRACT

Systems, methods and computer products for recording of repeated programs. Exemplary embodiments include a recording of a repeated program method, including receiving a recording request for a first program from a communications device, the recording request having a specified recording time, determining that the specified recording time is during a peak time, determining an alternate recording time for the recording request, sending a message to the communications device that there is the alternate recording time to record the first program, delivering the first program to the communications device for the specified recording time in response to receiving a rejection of the alternate recording time and delivering the first program to the communications device for the alternate recording time in response to receiving an acceptance of the alternate recording time.

17 Claims, 3 Drawing Sheets

SYSTEMS, METHODS, AND COMPUTER PRODUCTS FOR RECORDING OF REPEATED PROGRAMS

BACKGROUND

The present invention relates generally to IPTV multimedia systems, and more particularly, to systems, methods and computer products for recording of repeated programs.

Internet protocol television (IPTV) is a digital television delivery service wherein the digital television signal is delivered to residential users via a computer network infrastructure using the Internet Protocol (IP). Typically, IPTV services are bundled with additional Internet services such as Internet web access and voice over Internet protocol (VOIP). In exemplary embodiments, a subscriber accesses playback IPTV operations through a set top box (STB) connected to their television for the reception of a digital signal. Used in conjunction with an IP-based platform, a STB allows for a user to access an LPTV service and any additional services that are integrated within the IPTV service. IPTV service platforms allow for an increase in the interactive services that can be provided to residential user. As such, a user can have access to a wide variety of content that is available via the IPTV service or the Internet.

As subscribers demand more and more content, higher definition services, interactive services, and data services, the amount of bandwidth required to meet demand continues to increase. While most portions of networks may have ample bandwidth, the "last mile," however, is often a bandwidth bottleneck. Service providers, then, are always striving to meet customer needs while efficiently utilizing available bandwidth.

Recording of content streams for later viewing during periods of high bandwidth demand is one example of inefficient bandwidth usage. Because programmers often present their very best programming at the same time, there is a high probability that a subscriber chooses to watch one program while simultaneously recording another program for later viewing. The bandwidth demand created by this consumer behavior is particularly significant when the programs being viewed and recorded are offered in High Definition (HD) formats. The HD format may require four times as much bandwidth as Standard Definition (SD) programming. Because the amount of programming in HD format is increasing, and because the number of devices capable of viewing and recording HD programming is also increasing, there is a need in the art for reducing the bandwidth that is consumed by recording devices during peak viewing periods.

BRIEF SUMMARY

Exemplary embodiments include a recording of a repeated program method, including receiving a recording request for a first program from a communications device, the recording request having a specified recording time, determining that the specified recording time is during a peak time, determining an alternate recording time for the recording request, sending a message to the communications device that there is the alternate recording time to record the first program, delivering the first program to the communications device for the specified recording time in response to receiving a rejection of the alternate recording time and delivering the first program to the communications device for the alternate recording time in response to receiving an acceptance of the alternate recording time.

Additional exemplary embodiments include a recording of a repeated program system, the system receiving a recording request for a first program from a communications device, the recording request having a specified recording time, determining that the specified recording time is during a peak time, determining an alternate recording time for the recording request, sending a message to the communications device that there is the alternate recording time to record the first program, delivering the first program to the communications device for the specified recording time in response to receiving a rejection of the alternate recording time and delivering the first program to the communications device for the alternate recording time in response to receiving an acceptance of the alternate recording time.

Further exemplary embodiments include a computer program product storing processor-executable instructions for receiving a recording request for a first program from a communications device, the recording request having a specified recording time, determining that the specified recording time is during a peak time, determining all alternate recording time for the recording request, sending a message to the communications device that there is the alternate recording time to record the first program, delivering the first program to the communications device for the specified recording time in response to receiving a rejection of the alternate recording time and delivering the first program to the communications device for the alternate recording time in response to receiving an acceptance of the alternate recording time.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments include systems, methods and computer products for recording of repeated programs. In exemplary embodiments, if a subscriber wants to record a program on a digital video recorder (DVR) (or other storage device), the systems and methods described herein conserve bandwidth by searching for other potential recording times for a program that is broadcast repeatedly. To conserve bandwidth, for a program that is repeated more than once (for example, a program that is shown three nights a week, at 9 PM, 11 PM, and 1 AM), the system locates the optimal time, from a bandwidth efficiency standpoint, to record that program to the DVR. The search may indicate to the user that the program showing at 1 AM is the best time to record (for example, by designating with an asterisk on an interface), or it may alternatively, automatically do the recording at the optimal time without user input.

Figure 1:
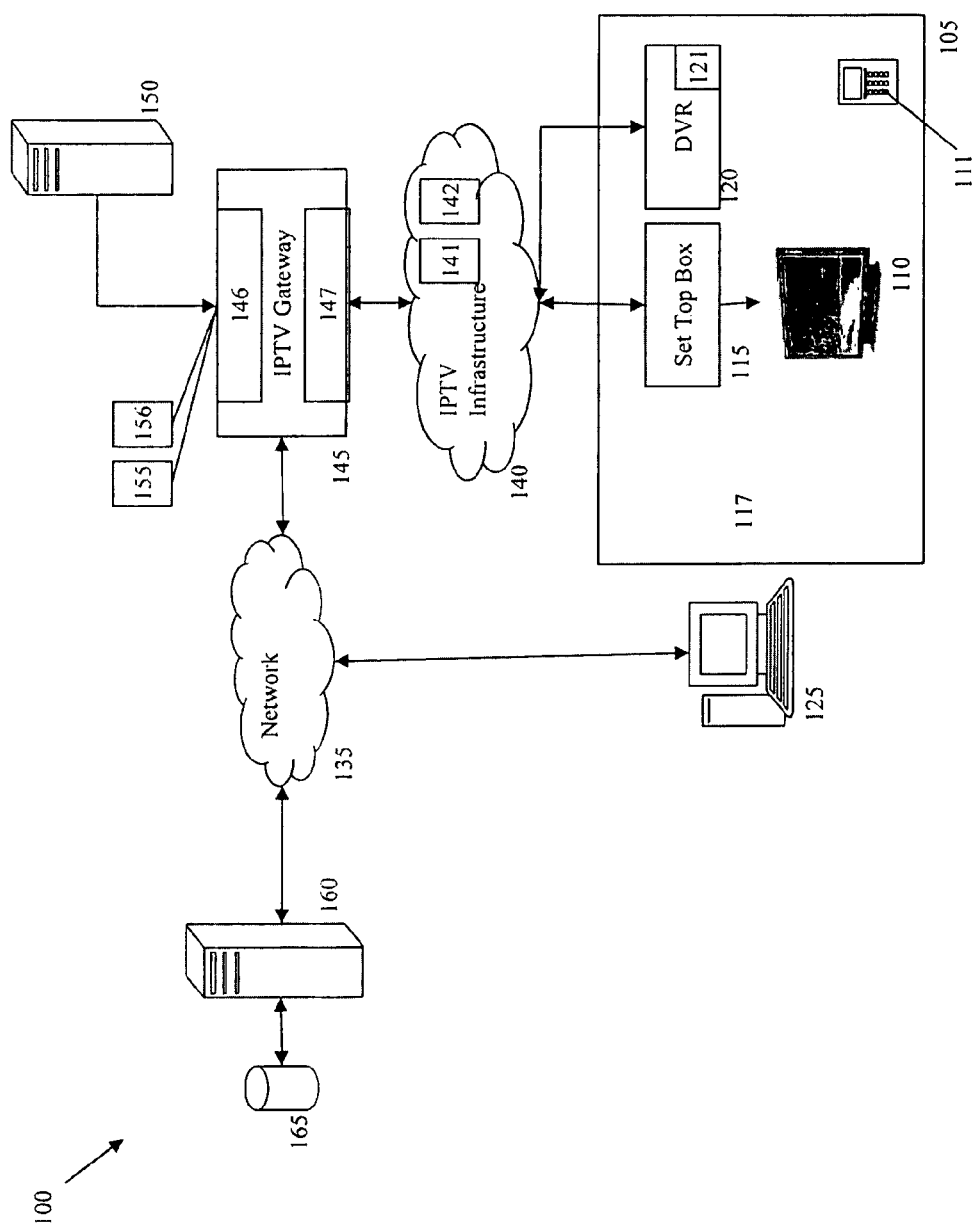
FIG. 1 illustrates a block diagram of an exemplary repeated program recording system.

Turning now to FIG. 1, a block diagram of an exemplary repeated program recording system 100 is now described. For ease of illustration, the system 100 of FIG. 1 depicts a simplified network infrastructure. In addition, for ease of illustration, the system 100 is described as implementing an Internet Protocol Television (IPTV) system for reception of programming and scheduling. It is understood that the systems and methods described herein can implement television and program-viewing systems other than IPTV. For example, the system 100 can implement cable, satellite, and antenna.

Furthermore, it is understood that a variety of network components/nodes may be utilized in implementing the embodiment described herein. For example, in exemplary embodiments, the system 100 includes a means for accessing network services for multiple disparate devices using a single sign on procedure. Therefore, the system 100 manages accounts, each of which is established for a community of devices and/or device subscribers, such as those devices and subscribers in a subscriber location 105, which may include a communications device 110 (e.g., an IPTV-enabled television) coupled to a set top box 115. Where the communications device 110 is IPTV-enabled, the set top box 115 includes a processor that provides bi-directional communications between an IPTV infrastructure 140 and the communications device 110 and decodes the video streaming media received as content programming and onscreen programming information, from a content services provider server 160, discussed further below. Other services can be provided to the subscriber location 105, such as, but not limited to phone services, network services and other exemplary services such as the repeated program recording services that can be implemented via the communications device 110. The accounts may thus include phone, network access and IPTV services and may be used to provide access to the repeated program recording services as described further herein. Furthermore, in exemplary embodiments, one of the devices (e.g., the communications device 110) can be provisioned for the network services described herein by associating a device identifier of the communications device with a respective account. The account, in turn, identities each of the communications devices belonging to the community and provides other information as described herein. Furthermore, it is appreciated that other devices such as a subscriber computer 125 can be further included in the community of devices established for the subscriber location 105. It is appreciated that the subscriber computer 125 can be local to the subscriber location 105 or can represent any other remote computer that can be used to access the services described herein. It is further appreciated that other remote devices can be implemented to access the services described herein such as but not limited to a cellular telephone (e.g., a 3 G cell phone), a personal computer, a laptop computer, a portable computing device (e.g., personal digital assistant), a digital music player (e.g., MP3 player), etc. As discussed further herein, a repeated program recording services interface can be rendered on any of the above-referenced devices to implement the repeated program recording services in accordance with exemplary embodiments.

In exemplary embodiments, one of the devices, such as communications device 110 (and the set top box 115 combination) can be used to establish account services, such as the repeated program recording services described herein. An account record may be generated for the subscriber at the subscriber location 105, which identifies the subscriber and the account for which the services (e.g., basic account services as described above and the repeated program recording services described herein) are associated. Account information and records may be stored in a storage device accessible by an IPTV gateway 145, discussed below. In exemplary embodiments, the IPTV gateway 145 implements one or more applications for establishing and utilizing the repeated program recording services account. Access to the repeated program recording services account may thus be created for a community of communications devices (e.g., the communications device 110) to enable the communications devices to implement the repeated program recording services as described herein. A preferences server 150, which is coupled to the IPTV gateway 145, includes preferences information for the subscriber location 105 as described further herein.

As discussed above, the system 100 of FIG. 1 includes the subscriber location 105, such as the subscriber's household. The subscriber location 105 can include the communications device 110 (e.g., an IPTV-enabled television) in communication with the set top box 115. The subscriber location 105 can further include a personal digital recorder such as a DVR 120, which is in communication with the communication device 110 and the set top box 115. It is understood that the set top box 115 and the DVR 120 may be two separate devices or be a single integrated device. In exemplary embodiments, the DVR 120 is hard-disk based, but may have other suitable storage media such as a cache, 121. It is appreciated that the DVR 120 can have other suitable memory devices for receiving and storing programming and scheduling data. Therefore, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

The subscriber location 105 can further include a remote control 111 for control and navigation of the communications device 110. As further described herein the remote control 111 can be implemented to navigate a repeated program recording services interface. As discussed above, the subscriber location 105 can further include one or more remote devices in its community of devices. For example, the remote devices can include the remote subscriber computer 125. In exemplary embodiments, the remote subscriber computer 125 can be part of the subscriber location 105 or a computer that is accessed remotely in order to access the repeated program recording services for control, management and scheduling of video content (e.g., content for recording on the DVR 120) from the content services provider server 160 to the subscriber location 105 for rendering on the communications device 110. It is therefore appreciated that access to repeated program recording services can be managed from locations remote to the subscriber location 105. It is understood by those skilled in the art that the remote subscriber computer 125 can include input and output devices, such as but not limited to a display, mouse, a keyboard, etc. As discussed further below, the aforementioned devices can all interact with the IPTV infrastructure 140 and the IPTV gateway 145. It is appreciated that any of the aforementioned devices can implement the repeated program recording services. In exemplary embodiments, the communications devices, such as the communication device 110, herein can have a network address associated with the communications devices such as an addressable uniform resource locator (URL), an Internet address, etc.

The system 100 can implement the repeated program recording services such that desired recording control, management and scheduling can be managed and viewed through the subscriber's IPTV-enabled device, such as the communications device 110, via the set top box 115, the remote devices (e.g., the remote subscriber computer 125) or other suitable device. As such, to coordinate IPTV communication, the system 100 may further include the IPTV gateway 145 that is in communication with the IPTV infrastructure 140. The IPTV infrastructure 140 and the IPTV gateway 145 are used in conjunction to communicate via a network 135. For example, a suitable device (e.g., the communications device 110 or the remote subscriber computer 125) at the subscriber location 105 can use the IPTV infrastructure 140 and the IPTV gateway 145 to communicate with the content services provider server 160 to access data from databases such as a database 165.

The network 135 can be an IP-based network for communication between the content services provider server 160 and the subscriber location 105 using communication devices such as but not limited to the communications device 110 (via the set top box 115, for example). The network 135 can be implemented to transmit content from the content services provider server 160 to the subscriber location 105 via a broadband connection, for example. In exemplary embodiments, the network 135 can be a managed IP network administered by a service provider. The network 135 can also be implemented in a wireless fashion, e.g., using wireless protocols and technologies, such as Wi-Fi, Wi-Max, etc. The network 135 can also be a cellular communications network, a fixed wireless network, a wireless local area network (LAN), a wireless wide area network (WAN), a personal area network (PAN), intranet, metropolitan area network, Internet network, or other similar type of network environment or other suitable network system and includes equipment for receiving and transmitting signals. In other exemplary embodiments, the network 135 can be a circuit-switched network such as a standard public switched telephone network (PSTN).

In exemplary embodiments, the IPTV infrastructure 140 can be an IP-based network that receives network data (e.g., programming content for recording on the DVR 120) from the content services provider server 160 and the preferences server 150, and delivers the network data to the set top box 115 for display or other rendering on the communications device 110. Alternatively, the network data can be for display or rendering, on the remote subscriber computer 125 or other suitable device.

In exemplary embodiments, as discussed above, the IPTV infrastructure 140 provides an interface between the subscriber location 105 and the IPTV gateway 145. In exemplary implementations, a notification server 141 and a terminal server 142 operate to interface communication between the subscriber location 105 via the set top box 115, and the IPTV gateway 145. For example, in exemplary implementations, the set top box 115 can provide a unique identification number so that the IPTV gateway 145 can route the network data to the set top box 115. The IPTV gateway 145 provides an interface between the content services provider server 160, and the IPTV infrastructure 140 and subscriber location 105. Furthermore, in exemplary embodiments, the IPTV gateway 145 handles notifications to the IPTV subscriber location 105 and can further provide a history of the notifications. A repeated program recording services application 155 can reside partially or wholly on the IPTV gateway 145 to handle the notifications as further described herein. In exemplary embodiments, the repeated program recording services application 155 can further reside partially or wholly on the set top box 115. When the subscriber sets up the repeated program recording services on the communications device 110 (or other device in the subscriber location 105 or the remote device 125), one of the network components of the system 100 (e.g., the set top box 115, or the IPTV gateway 145 can store specific scheduling information that the subscriber has created. For example, as discussed further herein, each subscriber can access and manipulate viewing and recording information for the DVR 120 via an interface. As such, if the interface is stored on the IPTV gateway 145, messages and notifications can be passed between the subscriber location 105 and the IPTV gateway 145 that include present scheduling and historic scheduling that the subscriber has created in the past. Furthermore, if any changes in the subscriber's scheduled recordings have occurred, messages can be passed to the subscriber location 105 (or the remote device 125) to notify the subscriber that a program scheduled to be recorded on the DVR 120 has changed. The subscriber can make changes accordingly.

In exemplary embodiments, the IPTV gateway 145 can further interface with the various system 100 elements as described herein. For example, the IPTV gateway 145 is in communication with the preferences server 150 to pass notifications and messages (e.g., Email messages) regarding permissions to create and edit repeated program recording information. For example, different members of the subscriber location 105 who share account services may have different recording schedules. For example, one member may have a unique recording schedule and another member may have a second unique recording schedule with little to no overlap with the first recording schedule. As such, each member can retrieve and edit those different schedules and be properly authenticated to retrieve and edit those schedules.

In exemplary embodiments, the IPTV gateway 145 can include a back end 146 and a front end 147. The front end 147 can be used to implement various provisioning activities such as but not limited to initial provisioning of IPTV addresses for the devices, such as the STB 115, at subscriber location 105. The back end 146 can be implemented for many of the repeated program recording services, such as but not limited to communicating with the content services provider server 160 and retrieving scheduling data from the database 165 and passing messages and notification to the IPTV gateway 145. As such, the back end 146 can include various elements including but not limited to a caller ID handler, an email handler, a message handler and a provisioning handler.

In exemplary embodiments, the IPTV gateway 145 may implement authentication using a high-speed processing device (e.g., a computer system) that is capable of handling high volume activities conducted via communications devices, and other network entities (e.g., parts of the IPTV infrastructure 140 or the network 135) via one or more networks (e.g., the IPTV infrastructure 140). The IPTV gateway 145 receives requests from one or more devices, such as the STB 115, from the subscriber location 105 to access network services, such as the repeated program recording services. The IPTV gateway 145 may implement authentication software for restricting or controlling access to network. The IPTV gateway 145 may be in communication with a customer identity system (CIS) database, which stores subscriber credentials (e.g., subscriber names and passwords) established via the repeated program recording services account.

In exemplary embodiments, the system 100 can further include the repeated program recording services application 155 that can reside on the IPTV gateway 145, as mentioned above. In exemplary embodiments, the repeated program recording services application 155 can be implemented by the subscriber to access and set up an interface 156 to implement the repeated program recording services application 155. The interface 156 can be implemented to search for and schedule programs on the DVR 120. The interface 156 can further be implemented to access account information from the IPTV gateway 145 and the preferences server 150. In exemplary embodiments, the repeated program recording services application 155 can include pointers to the content services provider server 160 for accessing scheduling information and for directing content to be recorded on the DVR 120. The pointers, in turn, may provide access to the schedules stored in the database 165 for streaming to the subscriber's set top box 115 for rendering on the interface 156.

In exemplary embodiments, the interface 156 also provides access to the IPTV gateway 145, such that messages and notifications can be passed between the subscriber location 105 and the IPTV gateway 145 that include present scheduling and historic scheduling that the subscriber has created in the past. Furthermore, if any changes in the subscriber's scheduled videos have occurred, messages can be passed to the subscriber location 105 (or remote device) to notify the subscriber that a program scheduled to be viewed has changed. The subscriber can make changes accordingly.

In exemplary embodiments, as discussed above, the system 100 further includes the content services provider server 160, which is in communication with the IPTV gateway 145 via the network 135. In exemplary embodiments, the content services provider server 160 is implemented by a host system (e.g., a high-speed processing device) that provides content to its subscribers (e.g., a subscriber of the communications device 110), such as television programs, premium programming services, video on demand content, and Internet/Web content (e.g., podcasts, streaming media, etc.). In exemplary embodiments, the content is transmitted to the subscribers (e.g., at the subscriber location 105) via a broadband connection over an Internet Protocol (IP)-based network (e.g., the network 135). The content services provider server 160 can also provide an onscreen electronic programming guide to customers (e.g., user of program receiving device 150) that provides information about current and future programming available via the content providers' services. Programming information provided by the onscreen electronic programming guide may include current and future program listings including program titles, primary actors/actresses, begin time, duration of program, a year in which the program was produced, and a brief text description of the program.

In exemplary embodiments, the content services provider server 160 is coupled to the database 165. In a one implementation, the database 165 may be representative of a given play list. A play list is associated with a particular program screen. For example, a play list can be generated for a given screen that is displayed for a view on the communications device 110. As a subscriber is browsing through different channels, and therefore different program content, as each new channel and program content are displayed on the communications device 110, a different play list may be accessed by the communications device 110 from the content services provider server 160, which can be via the set top box 115. In exemplary embodiments, play lists can include programming content, as well as programming schedules for the content (e.g., onscreen programming guide information). In exemplary embodiments, the database 165 stores records of programming events scheduled for transmission to customers, such as the communications device 110. These records, in turn, can be used in conjunction with the DVR 120 in order to schedule recordings.

In exemplary embodiments, upon a request from the subscriber location 105, the IPTV gateway 145 can coordinate obtaining the video from the database 165 and provide the acquired data (e.g., playlists and selected programs) for display and rendering at the subscriber location 105. As described, the coordination of acquiring the data and ultimately displaying the data on the communications device 110 (or other device) is implemented via the repeated program recording services application 155. Furthermore, the repeated program recording services application 155 coordinates the transfer of the program data from the database 165 for rendering on the communications device and for recording on the DVR 120.

Figure 2:
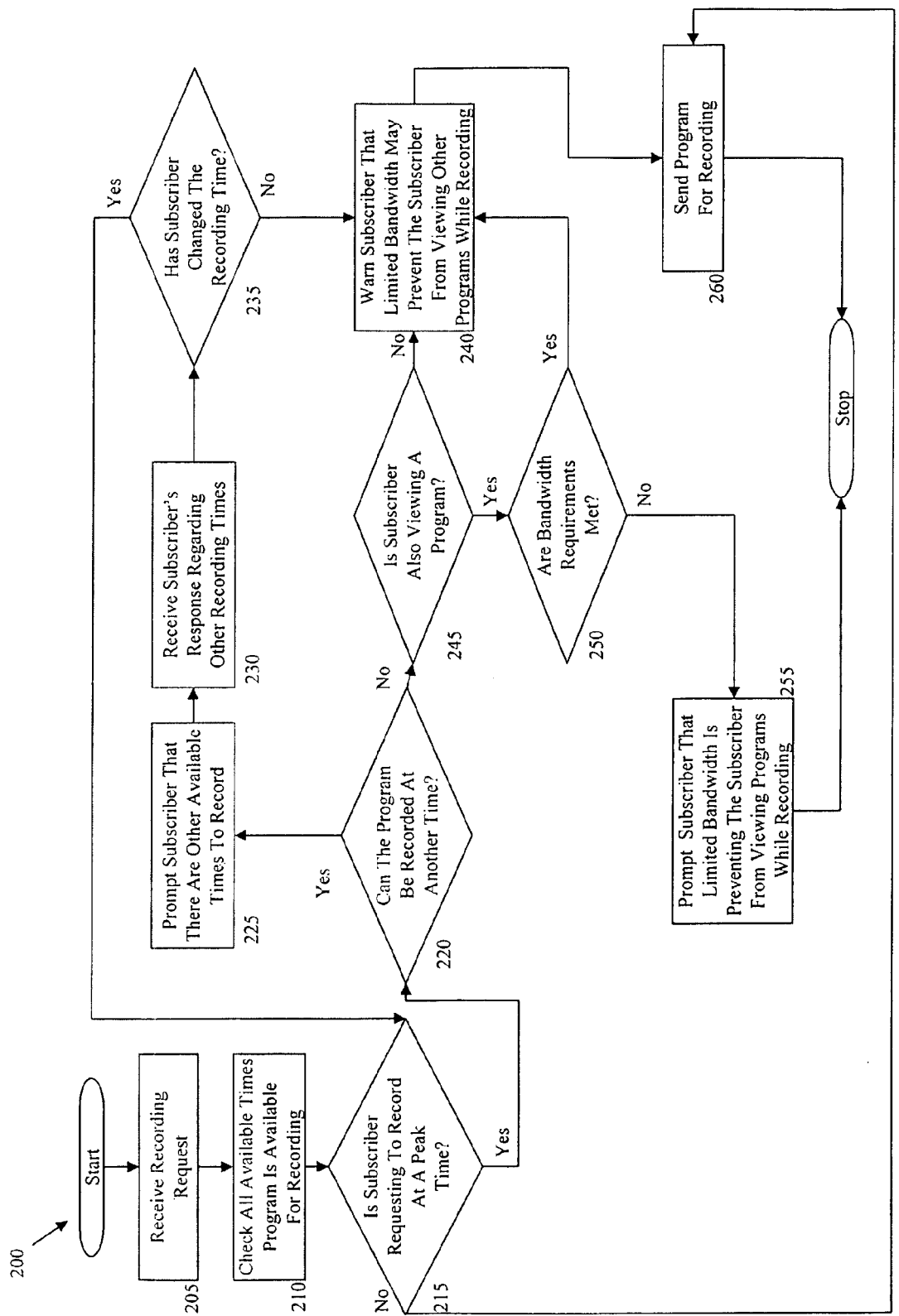
FIG. 2 illustrates a flow chart of a repeated program recording method in accordance with exemplary embodiments.

FIG. 2 illustrates a flow chart of a repeated program recording method 200 in accordance with exemplary embodiments. As discussed above, in exemplary embodiments, if a subscriber wants to record a program on the DVR 120, the repeated program recording services application 155 conserves bandwidth by searching for other potential recording times for the program, if the program is broadcast repeatedly. For a program that is repeated more than once, the system 100 locates the optimal time from a bandwidth efficiency standpoint to record that program to the DVR 120. For example, the system can search for non-peak times during which the program is available for viewing. During such non-peak times, the bandwidth is not under the same intensive demand as during peak times. The search may indicate to the user that the program showing at 1 AM is the best time to record (for example, by designating with an asterisk on the interface 156), or the system 100 may alternatively, automatically do the recording at the optimal time without user input, as discussed further with respect to FIG. 3 below.

At step 205, the subscriber makes a recording request, typically to the IPTV gateway 145 and to the content services provider server 160. At step 210, the repeated program recording services application 155 checks for all available times that the request program is available for recording. At step 215, the repeated program recording services application 155 determines whether or not the subscriber is requesting a recording at a peak time. In exemplary embodiments, as discussed above, the repeated program recording services application 155 determines that the time during which the subscriber is requesting a recording is within a peak time, and thus during a time in which the bandwidth includes multiple requests. The repeated program recording services application 155 further determines if there are other (non-peak) times during which the program can be recorded. If not, the program is sent to the subscriber location at step 260 by the repeated program recording services application 155. It is appreciated that this request may be present or at some future time. As such, it is appreciated that step 260 may occur at some future date (e.g., days or weeks) after the recording request is received at step 205.

At step 215, if it is determined that the program is being recorded at a peak time, then at step 220 the repeated program recording services application 155 determines whether or not the program can be recorded at another time with the data gathered at step 210. If at step 220, there are additional times in which the program can be recorded, the repeated program recording services application 155 prompts the subscriber about the other recording times at step 225. The subscriber can then choose to accept another time or keep the original recording time. At step 230, the repeated program recording services application 155 receives the user's response. The repeated program recording services application 155 then determines whether the subscriber has changed the recording time at step 235. If the subscriber has changed the recording time at step 235, the repeated program recording services application 155 repeats the method 200 at step 215 to check for bandwidth efficiency once again. If the subscriber has not changed the time, then the repeated program recording services application 155 sends the subscriber a warning message that due to limited bandwidth, the subscriber may be prevented from viewing other programs while recording at step 240.

Returning to step 220, if the program associated with the recording request at step 205 does not have any other recording times available, then if the request is a present request, the repeated program recording services application 155 determines whether or not the subscriber is presently viewing a program other than the program being recorded at step 245. If the subscriber is not also viewing another program at step 245, then the repeated program recording services application 155 sends the subscriber a warning message that due to limited bandwidth, the subscriber may be prevented from viewing other programs while recording at step 240. The program is sent to the subscriber location at step 260 by the repeated program recording services application 155. If at step 245, the subscriber is viewing another program other than the program being recorded, the repeated program recording services application 155 determines if all bandwidth requirements for delivering both programs to the subscriber location 105 are met at step 250. If the bandwidth requirements are met, the repeated program recording services application 155 sends the subscriber a message that due to limited bandwidth, the subscriber may be prevented from viewing other programs while recording at step 240. It is appreciated that the subscriber can often be sent the warning message simply to alert the subscriber that there could be viewing issues if bandwidth requirements are exceeded. The program is sent to the subscriber location at step 260. If at step 250, the bandwidth requirements are not met then the repeated program recording services application 155 sends the subscriber a message that due to limited bandwidth, viewing the additional program is not possible while recording, at step 255.

Figure 3:
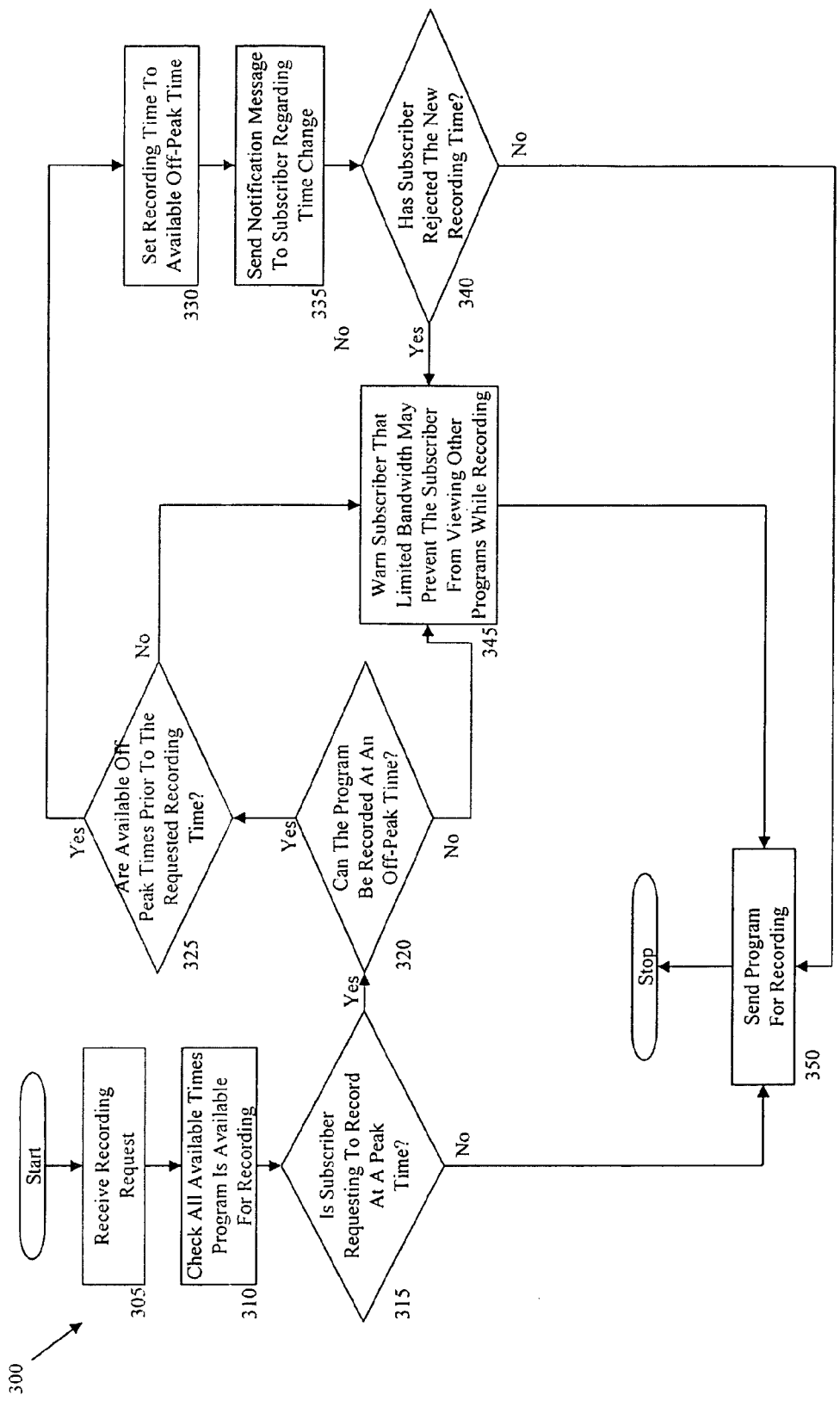
FIG. 3 illustrates a flow chart of a repeated program recording method in accordance with exemplary embodiments.

The method 200 as described above includes interaction from the subscriber. In exemplary embodiments, the system 100 and the repeated program recording services application 155 can optimize bandwidth performance by changing recording times without notifying or requiring input from the subscriber. FIG. 3 illustrates a flow chart of a repeated program recording method 300 in accordance with exemplary embodiments. The method 300 in FIG. 3 can provide subscriber with opportunity to accept a post-peak recording time when automatic recording at a pre-peak time is not an option. Furthermore, the method 300 in FIG. 3 can end in an opportunity for a subscriber to make a choice rather than receive a non actionable warning. It is thus appreciated that the method 300 of FIG. 3 can be associated with the method 200 of FIG. 2.

At step 305, the subscriber makes a recording request, typically to the IPTV gateway 145 and to the content services provider server 160. At step 310, the repeated program recording services application 155 checks for all available times that the request program is available for recording. At step 315, the repeated program recording services application 155 determines whether or not the subscriber is requesting a recording at a peak time. If not, the program is sent to the subscriber location at step 350. It is appreciated that this request may be present or at some future time. As such, it is appreciated that step 350 may occur at some future date (e.g., days or weeks) after the recording request is received at step 305.

At step 315, if it is determined that the program is being recorded at a peak time, then at step 320 the repeated program recording services application 155 determines whether or not the program can be recorded at an off-peak time with the data gathered at step 310. If at step 320, there are additional off peak times in which the program can be recorded, then at step 325, the repeated program recording services application 155 determines whether there are off-peak times during which the program can be recorded prior to the requested recording time, and if so, then the recording time is set to the off-peak recording time at step 330. If there are no other off-peak times prior to the requested recording time at step 325, then at step 345 subscriber is sent a warning message that due to limited bandwidth, the subscriber may be prevented from viewing other programs while recording.

At step 335, the repeated program recording services application 155 sends the subscriber a message about the other recording time change. In exemplary embodiments, the system 100 does not send a notification message. However, it is appreciated that the subscriber may be recording the program at a particular time for a reason and that a notification message is appropriate so that the subscriber is aware of the change. The subscriber can then choose to accept the time change or keep the original recording time. As such, the repeated program recording services application 155 determines at step 340 whether the subscriber has rejected the new recording time. If at step 340, the subscriber has rejected the time change, then at step 345 the repeated program recording services application 155 sends the subscriber a warning message that due to limited bandwidth, the subscriber may be prevented from viewing other programs while recording. The system 100 then sends the program at step 350.

Returning to step 320, if there are no other off-peak times available, then at step 345 the repeated program recording services application 155 sends the subscriber a warning message that due to limited bandwidth, the subscriber may be prevented from viewing other programs while recording. The system 100 then sends the program at step 350.

Returning to step 325, if there are no other off-peak times prior to recording the program, then at step 345 the repeated program recording services application 155 sends the subscriber is a warning message that due to limited bandwidth, the subscriber may be prevented from viewing other programs while recording. The system 100 then sends the program at step 350. In exemplary embodiments, the system 100 attempts to find a program prior to the scheduled recording because the subscriber should ideally have the program recorded prior to the scheduled recording time.

In exemplary embodiments, the recording medium on the DVR 120 can include multiple folders. A subset of the folders can be accessible by the subscriber for storage of recorded programs as described herein. Another subset of the folders can be accessible only by the content services provider server 160. Periodically, the content services provider server 160 can access the subset of folder to add content such as new movies that are anticipated to be popular. When executing the methods described above, when the subscriber makes a recording request, the repeated program recording services application 155 can also check the folders to determine if the content services provider server 160 has already populated the DVR 120 with the anticipated popular program at steps

210, 310. If the content services provider server 160 has already populated the DVR 120 with the program, then the repeated program recording services application 155 can transfer the program to the subscriber-accessible portion of the DVR 120, thereby making the program available to the subscriber.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A recording of a repeated program method, comprising:
  receiving a recording request for a first program from a communications device, the recording request having a specified recording time;
  determining that the specified recording time is during a peak time for bandwidth usage;
  determining an alternate recording time for the recording request;
  sending a message to the communications device that there is the alternate recording time to record the first program;
  delivering the first program to the communications device for the specified recording time in response to receiving a rejection of the alternate recording time;
  delivering the first program to the communications device for the alternate recording time in response to receiving an acceptance of the alternate recording time;
  determining by a recording application when a prior recording time for the first program precedes the specified recording time for the first program;
  delivering by the recording application the first program to the communications device at the prior recording time that precedes the specified recording time, without notifying a subscriber and without requiring input from the subscriber; and
  providing a notification to the communications device that viewing a second program while recording the first program may interfere with at least one of recording the first program and viewing the second program.

2. The method according to claim 1, further comprising determining whether the recording request is at the peak time.

3. The method according to claim 2, wherein the alternate recording time is a non-peak time.

4. The method according to claim 1, further comprising storing the first program on a recording medium coupled to the communications device.

5. The method according to claim 1, further comprising prompting the communications device to reschedule recording of the first program to a non-peak time.

6. The method according to claim 1, further comprising determining whether the subscriber is viewing the second program while recording the first program.

7. A recording of a repeated program system, comprising:
  means for receiving a recording request for a first program from a communications device, the recording request having a specified recording time;
  means for determining that the specified recording time is during a peak time;
  means for determining an alternate recording time for the recording request;
  means for sending a message to the communications device that there is the alternate recording time to record the first program;
  means for delivering the first program to the communications device for the specified recording time in response to receiving a rejection of the alternate recording time; and
  means for delivering the first program to the communications device for the alternate recording time in response to receiving an acceptance of the alternate recording time;
  a recording application configured to determine when a prior recording time for the first program precedes the specified recording time for the first program;
  wherein the recording application delivers the first program to the communications device at the prior recording time that precedes the specified recording time, without notifying a subscriber and without requiring input from the subscriber; and
  means for providing a notification to the communications device that viewing a second program while recording the first program may interfere with at least one of recording the first program and viewing the second program.

8. The system as claimed in claim 7, further comprising means for determining whether the recording request is at the peak time.

9. The system as claimed in claim 8, wherein the alternate recording time is a non-peak time.

10. The system as claimed in claim 7, further comprising means for storing the first program on a recording medium coupled to the communications device.

11. The system according to claim 7, further comprising means for prompting the communications device to reschedule recording of the first program to a non-peak time.

12. The system according to claim 7, further comprising means for determining whether the subscriber is viewing the second program while recording the first program.

13. A non-transitory computer readable storage medium storing processor-executable instructions for:
  receiving a recording request for a first program from a communications device, the recording request having a specified recording time;
  determining that the specified recording time is during a peak time;
  determining an alternate recording time for the recording request;
  sending a message to the communications device that there is the alternate recording time to record the first program;
  delivering the first program to the communications device for the specified recording time in response to receiving a rejection of the alternate recording time;
  delivering the first program to the communications device for the alternate recording time in response to receiving an acceptance of the alternate recording time;
  determining by a recording application when a prior recording time for the first program precedes the specified recording time for the first program;
  delivering by the recording application the first program to the communications device at the prior recording time that precedes the specified recording time, without notifying a subscriber and without requiring input from the subscriber; and
  providing a notification to the communications device that viewing a second program while recording the first program may interfere with at least one of recording the first program and viewing the second program.

14. A non-transitory computer readable storage medium as claimed in claim 13, further comprising instructions for determining whether the recording request is at the peak time.

15. A non-transitory computer readable storage medium as claimed in claim 14, wherein the alternate recording time is a non-peak time.

16. A non-transitory computer readable storage medium as claimed in claim 13, further comprising instructions for prompting the communications device to reschedule recording of the first program to a non-peak time.

17. A non-transitory computer readable storage medium as claimed in claim 13, further comprising instructions for determining whether the subscriber is viewing the second program while recording the first program.

* * * * *